Oct. 12, 1954     I. A. WILLIAMS     2,691,341
LUMBER MARKING APPARATUS Filed Oct. 16, 1950     5 Sheets-Sheet 1

INVENTOR.
Ivan A. Williams
BY Eugene D. Farley
Atty.

I. A. WILLIAMS

2,691,341

LUMBER MARKING APPARATUS

Filed Oct. 16, 1950

INVENTOR.
Ivan A. Williams
BY Eugene D. Farley
Atty.

Patented Oct. 12, 1954

2,691,341

UNITED STATES PATENT OFFICE 2,691,341

LUMBER MARKING APPARATUS

Ivan A. Williams, Portland, Oreg., assignor to M and M Wood Working Company, Portland, Oreg., a corporation of Oregon Application October 16, 1950, Serial No. 190,328

19 Claims. (Cl. 101—35)

The present invention relates to lumber marking apparatus. It pertains particularly to apparatus for marking or branding the end edges of plywood panels and panel board, and is described herein with particular reference to such application, although no limitation is thereby intended.

This application is a continuation-in-part of abandoned application Ser. No. 170,636, filed June 27, 1950, for Lumber Marking Apparatus.

In the manufacturing and marketing of plywood, it is desirable to mark the panels permanently with both the grade of the plywood and its brand name or trade-mark. This assists in the subsequent identification of the panels, both as to manufacturer and intended application.

The preferred location of the brand or mark on the panel is on the end edge. When located there, it does not mar the surfaces of the panel and is readily visible when, as is the usual practice, the panels are stacked one upon the other, and the stacks are arranged close beside each other in the warehouse or car.

Marking plywood panels in this manner presents, however, many difficult problems. The end edges are rough so that both smoothing and embossing operations are needed to secure uniform marking. The end grain is remarkably absorptive and is difficult to brand permanently with ink, which tends to bleed into the wood. Furthermore, because of the nature of the lay up, and alternate end and edge grain of the component wood veneers is presented to the surface, these having different absorptive capacities for marking ink.

Still further, the end grain of many wood veneers is very hard and will soon damage the usual labeling mechanism. Also, the pressure necessary for smoothing and embossing the end edges of the panels is of the order of several hundred pounds per square inch, and this is likely to rupture and break the veneers.

Other problems presented in marking the end edges of plywood panels include the following. Since plywood panels are handled horizontally in the mill, vertical inking rolls must be employed, which makes the satisfactory application of ink thereto very difficult. It is desirable to mark the panels in multiple colors, but this is difficult to effectuate using a single die without smearing or overruning the inks employed. Plywood is sold in various thicknesses and grades, and hence it is necessary that the marking mechanism be adjustable to accommodate the various plywood types. Since the panels are arranged horizontally in the stack, it is desirable that the marking be spaced in from the side edge of each panel in a fixed and uniform distance. Then, as the panels are stacked one upon the other with their edges registering, the marks in the various panels will lie one above the other, giving an orderly and pleasing appearance.

Also, it is desirable that the marks be centered carefully with respect to the thickness of the panels so that they will not overrun the edges and become illegible, or be printed on the bias. Still further, the movement of the panels through the apparatus must be synchronized with that of the die to obtain the proper printing action.

It therefore is a principal object of the present invention to provide apparatus for marking or branding lumber, particularly the rough, irregular end edges of plywood panels.

It is another object of this invention to provide apparatus for marking the absorbent end edges of lumber with ink, the inked mark being uniform in intensity and not characterized by bleeding into the lumber.

Another object of this invention is the provision of apparatus for marking horizontal plywood panels with vertical inking rolls.

Another object of this invention is the provision of apparatus for marking lumber in multi-colors.

Another object of this invention is the provision of apparatus for marking and compressing the hard end grain of plywood panels without damaging the marking mechanism.

Another object of this invention is the provision of lumber marking apparatus which is adjustable to accommodate lumber of varying dimensions and to register the mark on the panel both transversely and longitudinally.

Another object of this invention is the provision of lumber branding apparatus which may be adjusted rapidly and easily to brand the lumber with a selected one of a plurality of brands.

Still another object of this invention is the provision of lumber marking apparatus which may be effectively synchronized with the movement of the lumber passing therethrough.

Yet another object of this invention is the provision of lumber marking apparatus which is inexpensive to manufacture and operate; which is adaptable to the other lumber processing steps, particularly the operations involved in the fabrication of plywood; and which does not require extra labor for its operation.

The manner in which the foregoing and other objects of this invention are accomplished will be apparent from the following specification and claims considered together with the drawings wherein:

Generally stated, the presently described lumber marking apparatus comprises a rotary die, feed rollers stationed adjacent the die, means for driving the lumber between the feed rollers, and guide means for directing the lumber diagonally through the feed rollers in the direction of the peripheral surface of the die. This presses the lumber against the die, marking it and contemporaneously rotating the die so that the full inscription appearing thereon is transferred to the lumber.

Means are provided for maintaining the rollers an adjustable distance apart from each other to accommodate lumber of varying dimensions without crushing its edges during the marking operation. Means also are provided for adjusting the position of the die relative to the rollers, thereby permitting registration of the die with the lumber being marked and also the shifting of the die from one operative position to another.

Still further, means are provided for rotating the die independently of the driving force of the panel in frictional contact therewith. After the passage of each successive piece of lumber through the apparatus, this returns the die to a starting position at which it will mark the next succeeding piece a predetermined distance in from the edge. Thus the mark may be registered longitudinally as well as transversely with respect to the edge of the piece of lumber.

Since the apparatus is designed for use particularly in the handling of horizontal pieces of lumber, inking means are supplied incorporating vertical inking rolls together with means for applying an optimum amount of ink uniformly thereto. Still further, the inking mechanism is so arranged that ink of different colors may be applied to selected areas of the die, this resulting in imprinting the brand in multicolors.

Figures 1, 2:
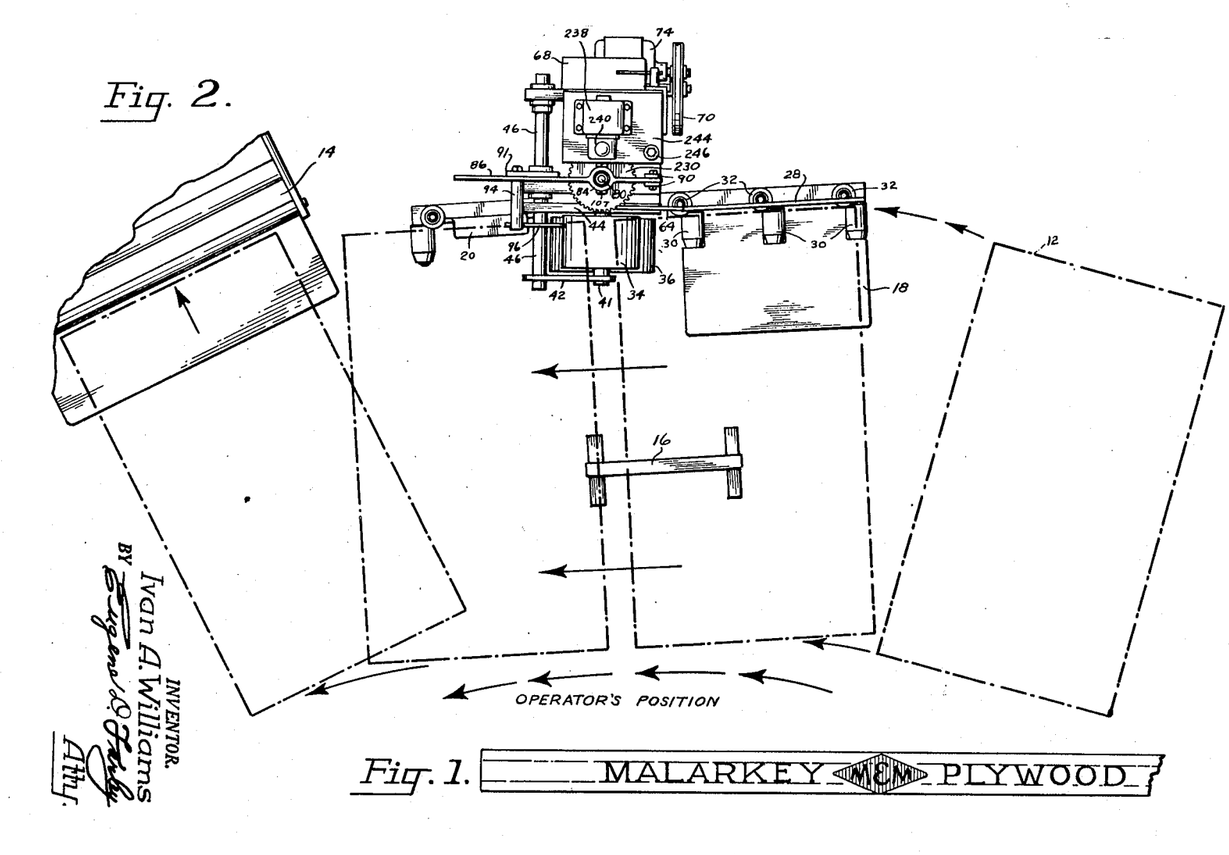
Figure 1 is a fragmentary end elevation of a plywood panel branded by the presently described marking apparatus.
Figure 2 is a plan view of a plant layout incorporating the presently described lumber marking apparatus.

Referring now more particularly to Figures 1 and 2 of the drawings:

In Figure 1 is illustrated the end edge of a piece of plywood 10 branded by the presently described apparatus. The brand is in two parts, the words "Malarkey Plywood" being in black, for example, and the diamond between these two words being in red or some other color. Alternatively, the grade or type of the product may be marked on the panel as, for example, "Resnprest DFPA Ext. Plywood."

The plant layout whereby plywood panels may most conveniently be branded using the presently described marking apparatus is illustrated in Figure 2. The preferred point of application is just after the panels have been trimmed but before they are put through the sander. Thus a stack 12 of the panels on a cart may be placed adjacent the apparatus and on the far side of the latter with respect to the sander 14. The panels then are lifted one at a time from the truck to a support member or horse 16 of suitable design, one end of the panel resting on the table 18 of the marking apparatus.

After passing through the apparatus, the panels are discharged onto the table 20, whence they may be transferred directly to the sander 14. In this manner, they may be run through the marking apparatus by the sander feederman and fed to the sander by the same operator. Furthermore, any slight markings which may be made on the faces of the panels by the apparatus will be removed by passage through the sander. Hence the entire marking operation may be effectuated with a minimum of effort and without the necessity of employing extra labor.

*The feeding mechanism*

Figure 3:
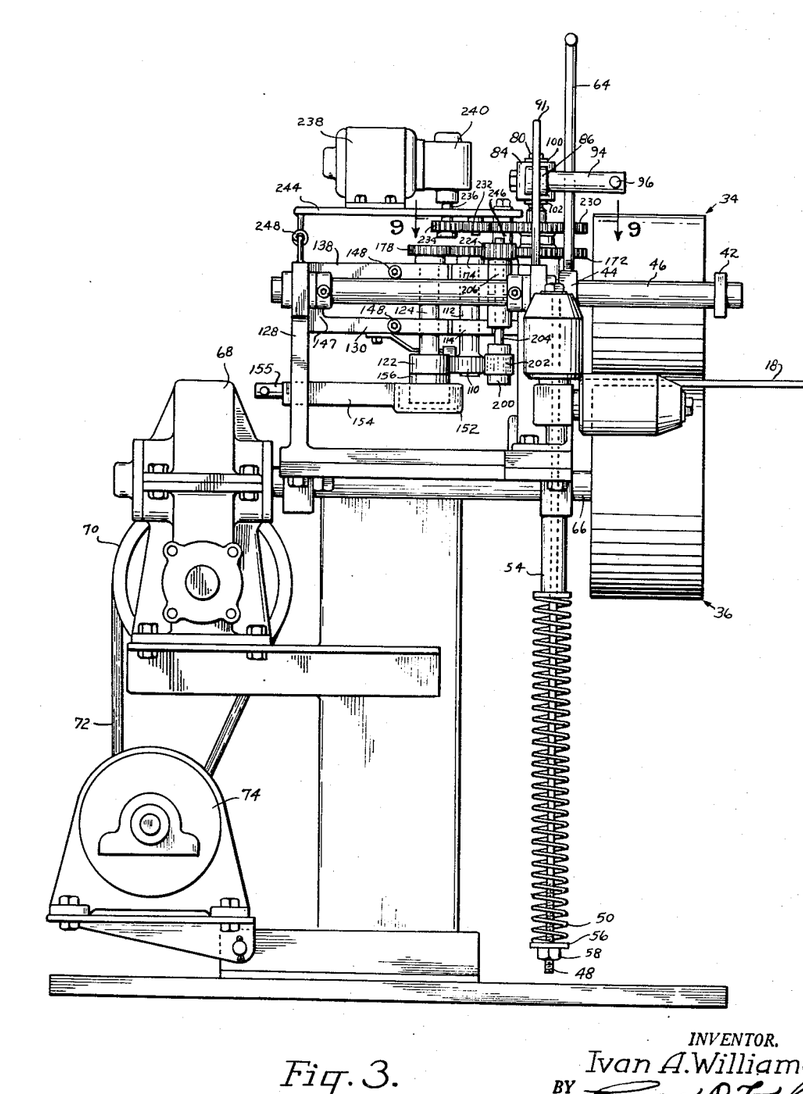
Figure 3 is a view in front elevation of the presently described lumber marking apparatus.
Figures 4, 5:
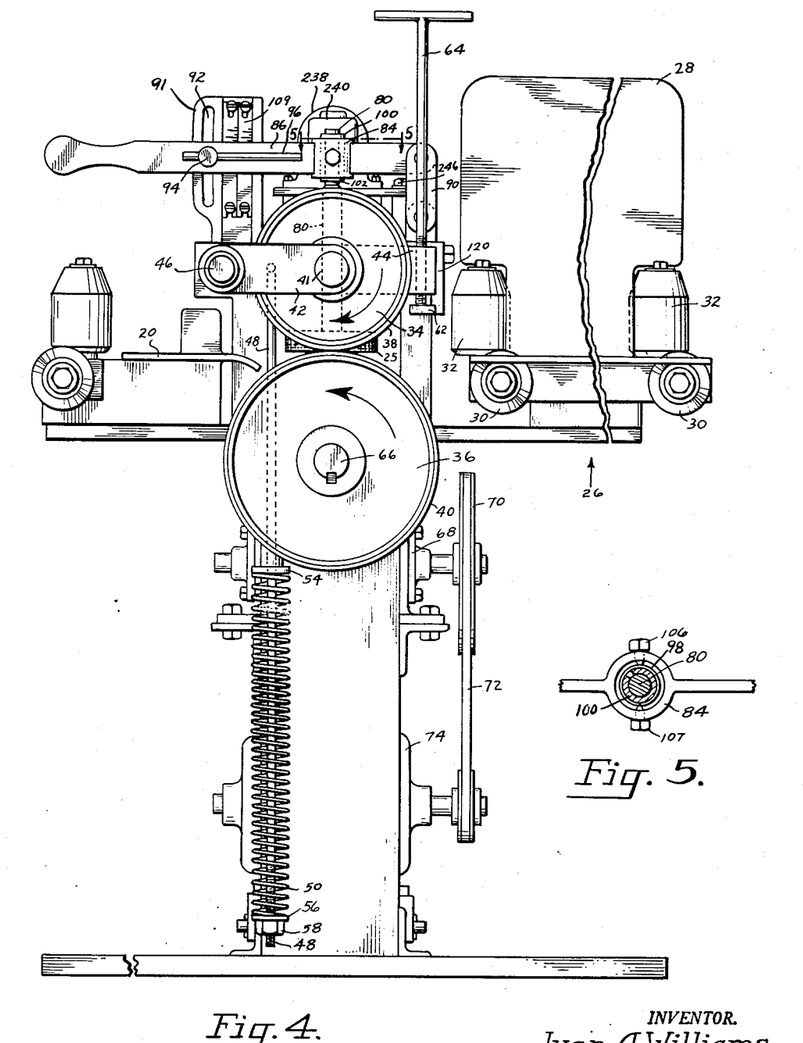
Figure 4 is a view in side elevation of the presently described lumber marking apparatus.
Figure 5 is a sectional view taken along the lines 5—5 of Figure 4.
Figure 6:
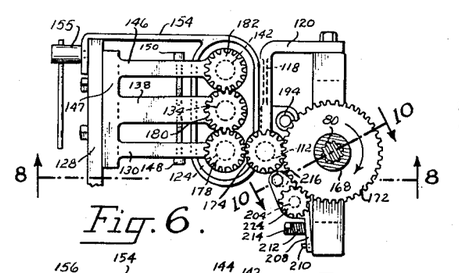
Figure 6 is a sectional view taken along the lines 6—6 of Figure 8.

The mechanism for feeding the pieces of lumber to the marking apparatus of this invention is illustrated particularly in Figures 3 and 4. It is adapted to feed the lumber to a revoluble die 25 and to press it thereagainst with a sufficient pressure to smooth the rough surface in contact therewith and to imprint it with the characters on the die. It broadly comprises a support means for holding the lumber, feed rollers for passing the lumber through the apparatus, and guide means for directing the lumber diagonally through the feed rollers in the direction of the peripheral surface of the die. The spiralling action occurring as a result of passing the lumber on the bias between the rolls presses it against the die with a pressure of from 300 to 500 pounds per square inch which is sufficient to accomplish the desired smoothing and embossing action.

In the illustrated embodiment, the support means and guide means are combined in the structure indicated generally by the numeral 26 (Figure 2). It includes the table 18, referred to above as cooperating with the support 16 in supporting the piece of lumber as it is passed through the apparatus. The table is of appropriate dimensions and is suitably supported, as by being attached to the frame of the apparatus. It is provided with a vertical backing plate 28 which is aligned substantially with the peripheral surface of the die 25 adjacent the feed rollers. To facilitate traversal of the table 18 by the lumber, it is provided with the horizontal gauge rolls 30 and the vertical gauge rolls 32.

The lumber then is fed from the combined guide and support means to the feed rollers. These comprise an upper roller 34 and a lower roller 36 preferably provided, respectively, with peripheral coatings 38, 40 of a resilient material such as rubber. The feed rollers are rotatably mounted opposite each other and are stationed with respect to the die 25 in such a manner that the edge of lumber passing between the rollers will be opposite to and in frictional engagement with the die.

To prevent crushing the edges of the lumber as it passes between the rollers, the rollers are positioned a spaced distance apart from each other, the spacing being adjustable to accommodate pieces of lumber of varying thickness. This may be accomplished by mounting roller 34 on a shaft 41 journalled to a pair of parallel, spaced apart supporting arms 42, 44. These, in turn, are pivotally mounted on the shaft 46 attached to the frame of the apparatus.

Means also are provided for urging roller 34 resiliently in the direction of roller 36 to maintain a desired but yielding pressure against the panel as it passes between the rollers. Thus the downwardly extending rod 48 is attached to the roller assembly, preferably to the supporting arm 44. Rod 48 then is connected to a heavy compression spring 50 contained between retaining member 54 located centrally on the rod and washer 56 on the free end thereof. The latter end is threaded and fitted with a nut 58 which bears against washer 56. Hence the spring 50 is placed under tension determined by the setting of nut 58, and any upward displacement of roller 34 results in a corresponding compression of the spring.

When pieces of lumber such as plywood panels are passed between the feed rollers, the rollers separate sufficiently to accommodate the panels, but against the tension of spring 50. The pressure exerted during this process may be sufficient to damage the corners of the panel edge. Hence means are provided for maintaining the rollers a spaced distance apart from each other. In the form selected for illustration, such means comprise the rod 64 adapted to contact the shoulder or stop 62 in the frame of the apparatus. Rod 64 preferably is threaded through arm 44 which supports the upper feed roller. Thus the latter is maintained separated from the lower feed roller by a distance determined by the setting of the screw on rod 64.

Although various means may be employed for driving the lumber between the feed rolls, it is preferred to provide a live feed roll assembly which, in addition to pressing the lumber against the die, will also drive it through the apparatus. Hence feed roll 36 may be keyed to a shaft 66 journalled to the frame of the apparatus and driven through suitable reduction gears 68 operated by pulley 70. The latter, in turn, is driven through belt 72 by motor 74. In this manner, the rotary speed of the lower feed roll, and hence the speed of advancement of the panel through the apparatus, is determined by the operating speed of the motor and the linkages through which it acts.

*The marking mechanism*

As has been indicated hereinabove, a plywood panel, panelboard, or other piece of lumber passing through the feed rollers is pressed against the die 25 with substantial force. Since the die is freely revoluble, it is rotated by the resulting frictional engagement with the panel. This smooths the rough edge of the latter and embosses it with the characters on the die. The marking may be an intaglio impression, preferably colored as a result of the application of ink of one or more colors to selected areas of the die. This is accomplished as follows:

Die 25 is rigidly affixed to the lower end of a shaft 80. This shaft is rotatably mounted at its lower end in bearing 82 and at its upper end in a support collar 84. The construction of bearing 82 is such, however, that the shaft is slidable therein in an axial direction.

Support collar 84 is attached to a lever arm 86. One end of lever arm 86 is attached to the frame of the apparatus through toggle link 90. The other end is adjustably connected to an extension 91 of the frame having therein an arcuate slot 92. This is accomplished by inserting a screw clamp 94 operated by handle 96 through slot 92 in the frame extension.

To permit proper adjustment of lever arm 86, the support collar assembly 84 contains the floating collar 98 encircling shaft 80 and maintained within the housing by means of collars 100, 102 affixed to shaft 80 by set screws or other suitable means. Pivot pins 106, 107 penetrate the housing on opposite sides thereof and extend within floating collar 98. Hence shaft 80 is rotatably mounted within the bearing, but may be moved axially without binding by operation of lever arm 86.

It will be apparent that angular movement of lever arm 86 effects the axial displacement of shaft 80 as well as of die 25 carried thereby. As a result, the die may be moved to any selected position relative to the feed rollers and maintained in this position by tightening screw 94. This adjustment is necessary, for example, when it is desired to adjust the apparatus to accommodate panels of varying thickness or when it is desired to register with the work a selected one of a plurality of inscription bands carried by the die. To facilitate this purpose, gauges or scales 109 may be stationed at an appropriate spot on the frame with reference to lever arm 86.

Ink of selected colors may be applied to the die through the mechanism shown particularly in Figs. 6–14, inclusive. Thus ink of a first color, for example black, may be applied to the areas of the die carrying the figures "Malarkey Plywood" as indicated in the Figure 1. An inking roll 110 preferably having a peripheral coating of rubber or similar resilient material normally is in operative position relative to die 25. It is rigidly affixed to a shaft 112 journalled in a lower bearing 114 and an upper bearing 116. Lower bearing 114 is connected to the frame of the apparatus through a relatively thin, flexible arm 118. Upper bearing 116, however, is connected to the frame through the relatively heavy arm 120.

Inking roll 110 is in contact with the terminal one of a group of ink transfer rolls operating in an ink well. Thus it is in peripheral contact with ink transfer roll 122 affixed to shaft 124 journalled in bearings 126 which, in turn, are connected to the frame member 128 through the flexible arms 130. Ink transfer roll 122, in turn, is in contact with ink transfer roll 132 attached to shaft 134 journalled in bearings 136. The latter then are connected to frame member 128 through the relatively heavy arms 138. Similarly, ink transfer roll 132 is in peripheral contact with ink transfer roll 140 rigidly affixed to shaft 142 journalled in bearings 144. Bearings 144 are connected to frame member 128 through the flexible arms 146. For simplicity of construction, arms 130, 138 and 146 carrying, respectively, bearings 126, 136 and 144 may be formed integrally with a backing plate 147, attached to the frame member 128.

The above mounting permits delicate adjustment of the relative position of the ink transfer rolls to each other so that an optimum amount of ink is transferred. To this end, there are provided screws 148 penetrating flexible arms 130 and threaded into the relatively heavy arms 138 supporting roll 132. Similarly screws 150 penetrate flexible arms 146 supporting transfer roll 140 and are threaded into arms 138 supporting roll 132. Thus it will be apparent that, by adjustment of screws 148, 150, ink transfer rolls 122, 140 may be advanced toward and retracted from ink transfer roll 132 by the small increments necessary for maintaining optimum separation of these rolls.

Figures 7, 8, 9, 11, 12, 13, 14:
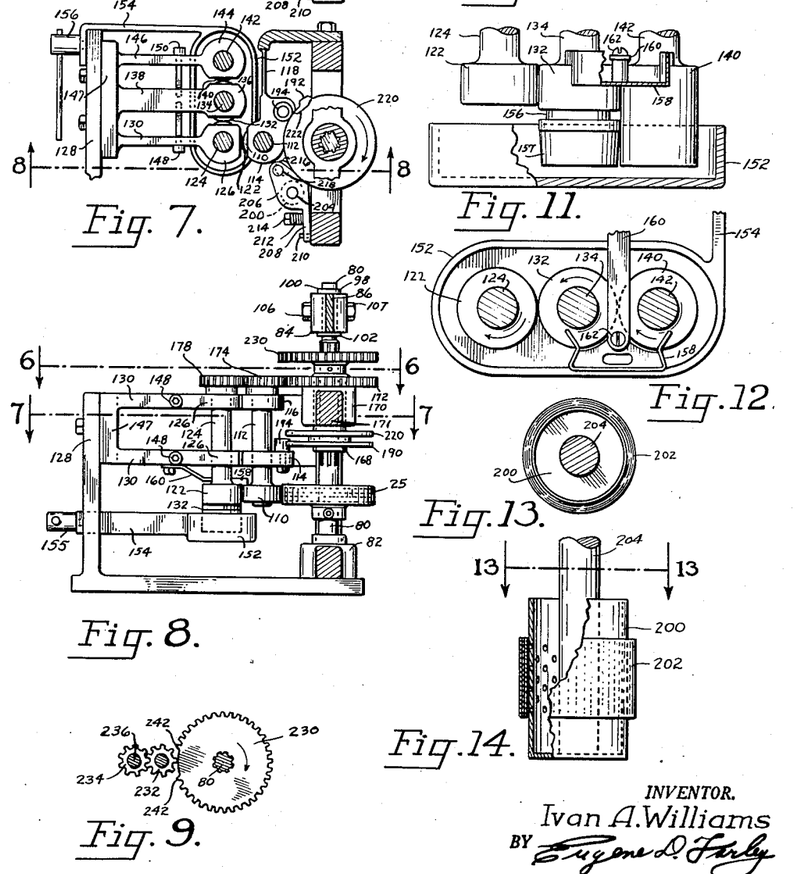
Figure 7 is a sectional view taken along the lines 7—7 of Figure 8.
Figure 8 is a view in elevation, partly in section, taken along the lines 8—8 of Figures 6 and 7.
Figure 9 is a sectional plan view taken along the lines 9—9 of Figure 3.
Figure 11 is a fragmentary sectional view of the inking mechanism employed for applying ink of a first color in the presently described lumber marking apparatus.
Figure 12 is a plan view of the inking mechanism of Figure 11.
Figure 13 is a sectional view of inking mechanism for applying ink of a second color in the presently described lumber marking apparatus taken along the line 13—13 of Figure 14.
Figure 14 is a view in side elevation of the inking mechanism of Figure 13.
Figure 10:
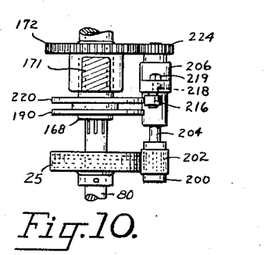
Figure 10 is a fragmentary view in elevation taken along the lines 10—10 of Figure 6.
Figure 15:
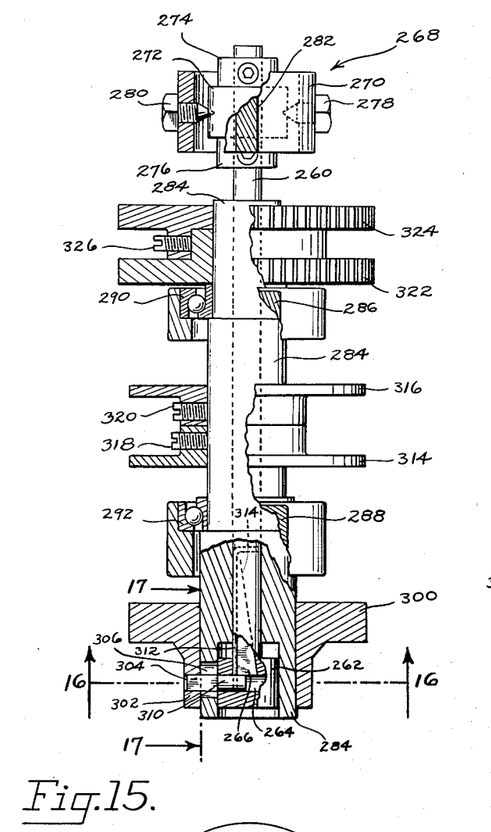
Figure 15 is a fragmentary view in elevation, partly in section, illustrating an alternate construction of the die assembly.

As is particularly apparent from Figures 11 and 12, inking rolls 122, 132, and 140 dip into an ink well 152 releasably attached to the frame of the apparatus through an arm 154 with screw clamp 155 and filled with ink of suitable physical properties. The relative proportions and arrangement of the transfer rolls preferably are such that transfer rolls 132 and 140 only dip into the ink. Roll 140 may have a substantially continuous peripheral surface as indicated. Roll 132, however, preferably has an annular groove 156 in its peripheral surface and a tapered terminal portion 157. This construction controls the amount of thick, viscous ink picked up by the rolls.

Any excess ink which may overflow rolls 132, 140 is returned to the well by means of a suitable scraping mechanism. This comprises a scraper 158 adjustably mounted on arm 160 through screw 162. The scraper is maintained in contact with the upper end surfaces of the rolls and serves to scrape off and return to the bath any surplus ink carried upwardly thereby. As a result of this construction, a controlled and uniform film of ink is carried to the upper portion of transfer roll 132, whence it is transferred to transfer roll 122 which, in turn, carries it over to inking roll 110.

Means also are provided for rotating inking roll 110 and ink transfer rolls 122, 132, 140 synchronously with the rotation of die 25. Connected to shaft 80 which carries the die, as by being splined thereto, is a hollow shaft or casing 168. Casing 168 is rotatably mounted in a bearing 170 connected through an arm 171 to the frame of the apparatus. This construction results in rotation of casing 168 with die 25, while permitting the axial displacement of shaft 80 within the casing.

Rigidly connected to casing 168 is a gear 172. Gear 172 drives a gear train including gear 174 attached to shaft 112 and supported against the upper bearing member 116. Gear 174 meshes with gear 178 affixed to shaft 124 of ink transfer roll 122 and supports the same against the upper surface of bearing 126. Gear 178 then engages gears 180, 182 affixed in an analogous manner to the upper ends of shafts 134, 142 carrying respectively ink transfer rolls 132, 140. Hence as die 25 revolves, it contemporaneously revolves gear 172 and the associated gear train including gears 174, 178, 180 and 182. In this manner, the inking rolls of the assembly are rotated synchronously with the die, applying ink of a first selected color to the peripheral surface thereof.

As has been indicated above, inking roll 110 normally is in operative position for contacting the raised characters on the surface of the die. In order to apply ink of a second color to the die, however, it is necessary that mechanism be employed for shifting roll 110 to an inoperative position so that selected areas of the die surface will be uninked by ink of the first color, remaining free for application of ink of the second color. For example, in the inscription illustrated in Fig. 1, an uninked die surface should be left between the words "Malarkey Plywood," so that the intermediate diamond may be coated with ink of a second color. Such mechanism in the illustrated form is as follows.

Casing 168 which is rotated by the die has rigidly affixed thereto a cam 190 formed with a lobe 192. The housing of bearing 114 in which is journalled the shaft supporting the inking roll 110 has on a surface thereof the roller 194 adapted to act as a follower for the cam. The relative positions of inking roll 110 and die 25 are such that they normally are adjacent each other as roller 194 follows the arcuate surface of the cam. However, when the roller contacts lobe 192 on the cam, the inking roll 110 is separated from the die, this action occurring through flexure of the resilient arm 118 and compression of the rubber coating of inking roller 110 against ink transfer roller 122. Then after lobe 192 has passed roller 194, the tension of resilient arm 118 returns the inking roll to its normal, operative position adjacent the peripheral surface of the die.

Provision is made for inking the surface of the die skipped by inking roll 110 with ink of a second color, for example red. For this purpose, an inking assembly having the following construction may be included.

Stationed adjacent die 25 is a hollow cylinder 200 adapted to be filled with ink and having a central perforated area covered with an absorbent cloth 202. Cylinder 200 is supported by a shaft 204 journalled in bearing 206. The latter bearing is connected to the frame of the apparatus through an arm 208 (Figure 7) by means of dowel pins 210, which permit a limited pivotal movement of the arm against the tension of a spring 212 on screw 214. Bearing 206 carries a roller 216 rotatably and eccentrically mounted on a shaft 218 journalled in the bearing housing and having extending outwardly therefrom a threaded section adapted to be engaged by nut 219.

Roller 216 is adapted to follow a cam 220 rigidly affixed to casing 168. The surface of cam 220 is uniformly arcuate except for a depression 222. The spacing between inking roll 200 and the peripheral surface of die 25 is such that, as roller 216 follows cam 220, the inking roll is out of contact with the peripheral surface of the die. However, when the roller enters the depression in the cam, the tension of spring 212 urges the inking roll into momentary contact with the die at the precise area left blank by inking roll 110 through the operation of its cam 190.

To rotate inking rolls 200 synchronously with the die, shaft 204 carrying the roll has affixed rigidly to its upper end a gear 224. Gear 224 meshes with gear 172 rigidly affixed to casing 168. Hence as the die revolves, gear 172 drives gear 224 which, in turn, rotates inking roll 200 through shaft 204. This insures that a freshly inked surface of the inking roll will always be presented to the die during operation of the inking roll assembly. Alternatively, the gear 224 may be omitted from the assembly, shaft 204 being freely revoluble and rotated by periodic engagement of inking roll 200 with the die 25.

*The registering mechanism*

In addition to providing means for registering the mark imprinted by the die 25 transversely on the lumber as it passes through the apparatus, means also are provided for registering the mark longitudinally on the lumber. This is particularly desirable in marking the end edges of plywood panels which are to be stacked one above the other during storage and transportation since, when the panels are thus stacked in registry with each other, the mark or brands on each panel will be aligned with each other, presenting a neat appearance. In addition, it insures that the entire mark will appear on the panel, not merely fragments thereof.

The construction of the registering assembly is particularly evident in Figures 2 and 3. Shaft 80 on which die 25 is mounted is powered through gear 230 keyed to the shaft. Gear 230 is driven through a gear train including gears 232, 234. The gear 234 it attached to shaft 236, driven by motor 238 through gear reduction box 240.

Motor 238 and connecting linkages are operated at a speed such that, when they are operative, die 25 is driven at a slower rate than it is when it is driven by frictional engagement with a panel impelled through the apparatus by the powered feed rolls 34, 36. For this reason, one of the gears in the gear train, for example gear 234, is a ratchet gear permitting such accelerated movement of the die.

Means also are provided for arresting the rotary motion of the die at a predetermined position or starting point after the passage of each successive panel. Thus one of the gears of the gear train, preferably gear 230 (Figure 9) is discontinuous. As a result, after a given panel has passed through the apparatus, motor 238 will continue to drive the die until the area on gear 230 which is devoid of teeth is adjacent gear 232. The latter gear then will continue to rotate, but without driving gear 230 and die 25. However, when the next succeeding panel is passed through the apparatus, it drives die 25 and gear 230 through shaft 80 to which the die it attached. As a result, gear 230 is rotated until the teeth thereon again mesh with the teeth on gear 232 and the motor drive is in operative position.

To facilitate the above described meshing operation between gears 230 and 232, the teeth which are adjacent the stripped area, for example teeth 242, may be sharpened. Further to prevent jamming of the teeth on these two gears and consequent damage to the apparatus, motor 238 may be mounted on a platform 244. The latter is pivotally connected to the frame of the apparatus through pin 246. It is resiliently maintained in position by means of spring 248 interconnecting the other end of the platform with the frame of the apparatus. Hence should jamming of the gears 230, 232 occur, platform 244 moves against the tension of spring 248 until meshing of the gears occurs. Spring 248 then returns the platform and the gears of the gear train to their normal operative position.

*Alternate construction*

An alternate construction for the die assembly used in the presently described lumber marking apparatus is illustrated in Figures 15–18, inclusive. This assembly has for its primary purpose the provision of a construction in which the die is readily removed and attached. This is highly desirable in commercial operation where a variety of lumber products are being branded, requiring a substantial number of interchangeable dies.

In the construction of this embodiment, the die is mounted upon a vertical shaft 260 which corresponds in position and function to shaft 80 of the previously described embodiment. The lower portion of the shaft is formed with a section 262 of enlarged diameter having therethrough a transverse perforation 264 communicating with a vertical slot 266, the purpose of which will appear hereinafter.

The shaft is supported by means of a floating collar assembly, indicated generally at 268. This is identical in construction with the support collar assembly illustrated in Figure 5 and described above. It comprises an outer casing 270 surrounding a floating collar 272 encircling shaft 260 and held in position by collars 274, 276 rigidly affixed to the shaft. Pivot pins 278, 280 penetrate outer casing 270 and extend into floating collar 272. An arm 282 is connected to the casing. It corresponds to arm 86 of the previously described embodiment and has for its function the elevating and lowering of the shaft and attached mechanism.

Shaft 260 is enclosed in an elongated, hollow shaft 284 which serves to mount the die and other elements of the apparatus. It is supported within the frame extensions 286, 288 through ball bearing assemblies 290, 292, respectively. Die 300 bearing on its peripheral surface the legend to be inscribed on the lumber is mounted upon hollow shaft 284. It is formed with a hub or base 302 which has a radial perforation 304 registerable with a slot 306 in hollow shaft 284.

A pin 310 provided with shoulders, preferably by forming the pin in two sections, one cylindrical and one flat, is adapted to lie within the transverse opening 264 through the enlarged portion of the shaft 260 with the flat portion extending through slot 306 in hollow shaft 284 and through perforation 304 in the hub of the die. Pin 310 has a transverse recess adapted to receive one end of a spring 312 the remainder of which lies within slot 266 in shaft 260, being anchored in this position through a section 314 bent substantially at right angles to the body of the spring and extending through a transverse opening in the shaft 260.

Figure 16:
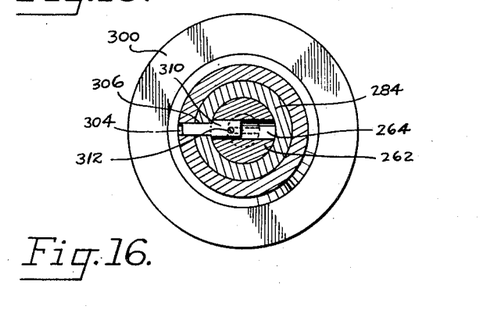
Figure 16 is a sectional view taken along the line 16—16 of Figure 15.
Figure 17:
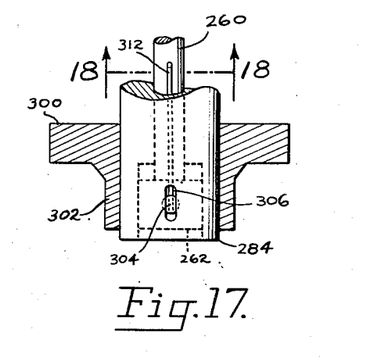
Figure 17 is a detail view, partly in section, taken along the line 17—17 of Figure 15.
Figure 18:
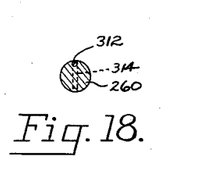
Figure 18 is a sectional view taken along the line 18—18 of Figure 17.

Thus, to mount a die on the assembly, pin 310 is depressed and the die placed over hollow shaft 284, the die and shaft being disposed so that perforation 304 in the hub of the die registers with slot 306 in the hollow shaft which, in turn, is in registry with transverse opening 264 through shaft 260. Urged by spring 312, pin 310 is extended through slot 306 and opening 304. It is held in this position by contact of the shoulder between the flat and cylindrical pin sections with the inner wall of hollow shaft 284 (Figure 16). The die then is fixed in place ready for use. When it is desired to remove or change it, pin 310 is forced into its retracted position by means of a punch or similar implement, whereupon the die may be slipped off the end of the shaft and a new one put on. In this manner, there is afforded a simple, yet effective way, of changing dies.

The assembly associated with the die and shafts 260 and 284 also includes cams 314 and 316 rigidly but adjustably attached to the shaft through set screws 318, 320, respectively. These cams correspond to cams 190 and 220 of the previously described embodiment and may be used to control the operation of the black and red inking rolls, respectively, in the manner described above.

Means for driving the inking rolls and for driving the die independently of frictional contact with the panel also may be associated with the shaft 284. Thus a gear 322 which corresponds to gear 172 of the previously described embodiment, used to drive the black inking roll assembly, may be rigidly affixed to hollow shaft 284. A gear 324 then may be mounted upon the hub of gear 322 through set screw 326. Gear 324 corresponds to gear 230 of the previously described embodiment and is used to drive the die by means of a motor analogous to motor 238, as above described.

*Operation*

The presently described lumber marking apparatus operates in the following manner.

Lumber, for example plywood panels about to be sanded, are conveyed adjacent the apparatus in a stack. The top panel of the stack then is lifted onto support member 16, one end of it resting also on table 18. The panel is adjusted when thus supported until it is flush against the aligned gauge rollers 32. In this position, it is directed into the marking apparatus tangentially with respect to the die 25. As soon as feed rollers 34, 36 engage the panel, they impel it through the apparatus. Because of the slightly diagonal passage of the panel through the feed rollers, it tends to spiral as it passes therebetween and to move axially in the direction of the die. This causes the edge of the panel to be pressed against the die with a force of from 300 to 500 pounds per square inch, which is sufficient to smooth the surface and emboss it with the desired marking.

It is to be noted that, during the marking operation, the pressure is localized on the panel by reason of using a rotary die. Hence, as opposed to using a stamp wherein the pressure is applied over a considerable area, the panel will withstand a substantial pressure without breaking. Also, to prevent marring of the faces of the panel, the spacing between the feed rollers may be adjusted by means of screw 64 until the proper tension is obtained between the rollers.

Furthermore, die 25 may be adjusted vertically to any selected position with reference to the feed rollers, as, for example, to register the mark transversely on the panels or to bring into operative position a selected one of several strips of insignia on the die. This may be accomplished by loosening screw 94, adjusting the lever arm 86 according to gauge 109 until it is in the selected location, and then tightening the screw.

While in contact with die 25, the panel rotates the same and is successively imprinted with whatever device appears on the die. During the imprinting procedure, the die is marked in selected areas with ink of different colors. This is accomplished by means of inking roll 110, which normally is in operative position ready to contact the raised figures on the die. This roll communicates with an adjustable inking roll assembly including ink transfer rolls 122, 132 and 140.

When areas of the die which are not to be inked by inking roll 110 are opposite this roll, cam 190 operates to lift the roll from its operative position, this being accomplished when lobe 192 on the cam engages roller 194 on the assembly including the inking roll. Outward displacement of the inking roll takes place against the tension of a flexible arm 113 which returns the inking roll to its operative position after lobe 192 has passed roller 194.

Ink of another selected color is applied to the area thus left blank on the peripheral surface of the die by means of inking roll 200. This roll normally is maintained in inoperative position separated from the die. However, when the recess in cam 220 is opposite roller 216 on the inking roll assembly, the roller is urged by the tension of spring 212 into the recess, thereby contemporaneously shifting the inking roll to operative position. There it momentarily inks the selected area of the die, after which it is returned to inoperative position as the roller leaves the recess in the cam. The inks thus applied to the die then are transferred to the piece of lumber in contact therewith, this continuing as long as the lumber passes through the apparatus.

The rollers comprising the inking mechanism are driven from gear 172 attached rigidly to casing 168 connected to shaft 80 carrying the die. Thus gear 172 drives gear 174 which rotates the inking roller 110 and also actuates the ink transfer rollers 122, 132, 140. Similarly, inking roll 200 is driven through gear 224 which also engages gear 172 attached to casing 168.

The adjustment of the inking roll required to maintain the delicate balance necessary for satisfactory inking is accomplished through screws 148 and 150 which adjust the positions of the ink transfer rolls relative to each other. The adjustment of inking roll 200 with respect to the die is accomplished through screw 214 which adjusts the tension of spring 212. The action of the inking roll 200 also is controlled through the eccentric shaft 218 which may be rotated to adjust this roll as desired. Still further, a scraper 158 and a grooved roller 132 are provided in the group of ink transfer rolls including rolls 122, 132 and 140 to prevent overrunning of the ink.

After the piece of lumber has passed entirely through the apparatus, the rotation of die 25 is continued by means of motor 238. This drives the die at a slower rate than does the frictional contact with the panel. It operates through a gear train including ratchet gear 234 which slips when the die is rotated by the panel, an intermediate gear 232, and a discontinuous gear 230. Driving of the die by the motor continues until the discontinuous portion of gear 230 is opposite gear 232 when it ceases. However, when the next panel is introduced into the apparatus, gear 230 is rotated until it again meshes with gear 232 and the drive unit including motor 238 is again in operative position. In this manner, it is insured that the die will be returned to a predetermined starting position or zero point after the passage of each panel.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claims.

Having thus described my invention, I claim:

1. Lumber marking apparatus comprising a rotary die, feed rollers stationed adjacent the die, power means for driving the lumber between the feed rollers, and guide means for directing the lumber diagonally through the feed rollers in the direction of the peripheral surface of the die, the feed rollers frictionally engaging the surfaces of the lumber and rotating in a plane extending diagonal to the direction of movement of the lumber, the feed rollers thereby pressing the lumber against the die while rotating the die and marking the lumber.

2. The lumber marking apparatus of claim 1 wherein the guide means for directing the lumber through the feed rolls comprises a support having thereon stop means tangentially aligned with the peripheral surface of the die.

3. The lumber marking apparatus of claim 1 wherein the guide means for directing the lumber through the feed rollers comprises a plurality of gauge rollers aligned with each other and directed tangentially toward the peripheral surface of the die.

4. Lumber marking apparatus comprising a rotary die, feed rollers stationed adjacent the die, the feed rollers having resilient peripheral surfaces adapted to yieldingly engage the lumber, power means for urging the lumber between the feed rollers, and guide means for directing the lumber diagonally through the feed rollers in the direction of the die and tangentially thereagainst for making an imprint on the lumber, the feed rollers frictionally engaging the surfaces of the lumber and rotating in a plane extending diagonal to the direction of movement of the lumber, the feed rollers thereby pressing the lumber against the die.

5. Lumber marking apparatus comprising a rotary die, a pair of spaced apart feed rollers stationed adjacent the die, means for adjusting the spacing between the feed rollers, power means for passing lumber between the feed rollers, and guide means for directing the lumber diagonally through the feed rollers in the direction of the die and tangentially thereagainst, the feed rollers frictionally engaging the surfaces of the lumber and rotating in a plane extending diagonal to the direction of movement of the lumber, the feed rollers thereby pressing the lumber against the die and contemporaneously imprinting the lumber.

6. Lumber marking apparatus comprising a rotary die, a pair of spaced feed rollers stationed adjacent the die, a lever arm rotatably mounting one of the feed rollers, a screw in threaded engagement with the lever arm, a stop adapted to be contacted by the screw whereby to enable adjustment of the lever arm and hence the spacing between the rollers, power means for driving the lumber between the rollers, and guide means for directing the lumber diagonally through the rollers in the direction of the die and tangentially thereagainst the feed rollers frictionally engaging the surfaces of the lumber and rotating in a plane extending diagonal to the direction of movement of the lumber, the feed rollers thereby pressing the lumber against the die.

7. Lumber marking apparatus comprising a rotary die, a pair of feed rollers stationed adjacent the die, means for pivotally mounting one of the feed rollers, resilient means connected to said one of the rollers for continuously urging it in the direction of the other roller, power means for driving the lumber between the rollers, and guide means for directing the lumber diagonally through the rollers in the direction of the die tangentially thereagainst, the feed rollers frictionally engaging the surfaces of the lumber and rotating in a plane extending diagonal to the direction of movement of the lumber, the feed rollers thereby pressing the lumber against the die and imprinting the lumber.

8. Lumber marking apparatus comprising a rotary die, a pair of feed rollers stationed adjacent the die, means for pivotally mounting one of the feed rollers, resilient means connected to said one of the rollers for continuously urging it in the direction of the other roller, adjustable stop means adapted to be engaged by the mounting of said one of the rollers for maintaining it a spaced distance apart from the other of the rollers, power means for driving the lumber between the rollers, and guide means for directing the lumber diagonally through the rollers in the direction of the die tangentially thereagainst, the feed rollers frictionally engaging the surfaces of the lumber and rotating in a plane extending diagonal to the direction of movement of the lumber, the feed rollers thereby pressing the lumber against the die and imprinting the lumber.

9. Lumber marking apparatus comprising a rotary die, a pair of feed rollers stationed adjacent the die, means for adjusting the relative positions of the feed rollers and the die whereby to register with the die selected areas of the lumber passing between the rollers, power means for driving the lumber between the feed rollers, and guide means for directing the lumber diagonally through the feed rollers in the direction of the die and tangentially thereagainst, the feed rollers frictionally engaging the surfaces of the lumber and rotating in a plane extending diagonal to the direction of movement of the lumber, the feed rollers thereby pressing the lumber against the die and contemporaneously imprinting the lumber.

10. Lumber marking apparatus comprising a rotary die, feed rollers stationed adjacent the die, means connected to the die for shifting the same transversely with respect to the rollers, thereby enabling registration of the die with lumber passing through the same, power means for urging lumber between the feed rollers, and guide means for directing the lumber diagonally therethrough in the direction of the die and tangentially thereagainst, the feed rollers frictionally engaging the surfaces of the lumber and rotating in a plane extending diagonal to the direction of movement of the lumber, the feed rollers thereby pressing the lumber against the die and contemporaneously marking the lumber.

11. Lumber marking apparatus comprising a rotary die, feed rollers stationed adjacent the die, means for applying ink to the peripheral surface of the die, power means for driving the lumber between the feed rollers, and guide means for directing the lumber diagonally therethrough in the direction of the die and tangentially thereagainst the feed rollers frictionally engaging the surfaces of the lumber and rotating in a plane extending diagonal to the direction of movement of the lumber, the feed rollers thereby pressing the lumber against the die.

12. Lumber marking apparatus comprising a rotary die, feed rollers stationed adjacent the die, means for applying inks of different colors to predetermined portions of the peripheral surface of the die, power means for driving the lumber between the feed rollers, and guide means for directing the lumber diagonally therethrough in the direction of the die and tangentially thereagainst the feed rollers frictionally engaging the surfaces of the lumber and rotating in a plane extending diagonal to the direction of movement of the lumber, the feed rollers thereby pressing the lumber against the die.

13. Lumber marking apparatus comprising a revoluble die, means for driving the lumber across the die, thereby rotating the same, a first inking roll carrying ink of a selected color and normally in operative position adjacent the die, resilient means for mounting the first inking roll, first cam means adapted to contact said resilient mounting and to move said first inking roll to inoperative position away from the die at predetermined intervals, a second inking roll impregnated with ink of a second color and normally in inoperative position separated from the die, mounting means for mounting the second inking roll, second cam means connected to the die and operated by the rotary motion of the same, said second cam means being adapted to contact said second mounting means at predetermined intervals, thereby moving the second inking roll to operative position adjacent the die.

14. Lumber marking apparatus comprising a rotary die, means for driving pieces of lumber successively across the peripheral surface of the die, thereby rotating the same, motor means for rotating the die independently of the driving force of the lumber, thereby continuing the rotation of the die after the passage of each separate piece of lumber, friction means interconnecting the die and motor means whereby the die is driven by the motor means only when the die is out of contact with the lumber, and means for arresting the rotary motion of the die at a predetermined station in the interval between the passage of successive pieces of lumber, thereby effecting the imprinting of each successive piece a selected distance from the end thereof.

15. Lumber marking apparatus comprising a revoluble die, means for driving lumber across the die, thereby rotating the same and imprinting the lumber, motor means for rotating the die independently of the driving force of the lumber thereagainst, friction means interconnecting the die and motor means whereby the die is driven by the motor means only when the die is out of contact with the lumber, said motor means continuing the rotation of the die after the passage of each successive piece of lumber and returning the die to a selected starting position.

16. Lumber marking apparatus comprising a revoluble die, means for driving lumber across the die, thereby rotating the same and imprinting the lumber, motor means for rotating the die independently of the driving force of the lumber, friction means interconnecting the die and motor means whereby the die is driven by the motor means only when the die is out of contact with the lumber, a gear train including a discontinuous gear interconnecting the motor means and the die, the motor means continuing the rotation of the die and returning the same to a selected starting position after the passage of each successive piece of lumber, said starting position being determined by the position of the said discontinuous gear relative to the other gears in the gear train.

17. Lumber marking apparatus comprising a revoluble die, means for driving lumber across the die, thereby rotating the same and imprinting the lumber, motor means for rotating the die independently of the driving force of the lumber, a gear train including a discontinuous gear interconnecting the motor means and the die, said gear train including also a ratchet gear for permitting rotation of the die at an accelerated rate by frictional contact with the lumber, the motor means continuing the rotation of the die and returning the same to a selected starting position after the passage of each successive piece of lumber, said starting position being determined by the position of the said discontinuous gear relative to the other gears in the gear train.

18. Apparatus for marking pieces of material, comprising a rotary die, feed rollers stationed adjacent the die, power means for driving the material between the feed rollers, and guide means for directing the material diagonally through the feed rollers in the direction of the peripheral surface of the die, the feed rollers frictionally engaging the surfaces of the material and rotating in a plane extending diagonal to the direction of movement of the material, the feed rollers thereby pressing the material against the die while rotating the die and marking the material.

19. Apparatus for marking the edge of plywood, comprising a rotary die, feed rollers stationed adjacent the die, power means for driving the plywood between the feed rollers, and guide means for directing the plywood diagonally through the feed rollers in the direction of the peripheral surface of the die, the feed rollers frictionally engaging the surfaces of the plywood and rotating in a plane extending diagonal to the direction of movement of the plywood, the feed rollers thereby pressing the plywood against the die while rotating the die and marking the plywood.

References Cited in the file of this patent

UNITED STATES PATENTS

| Number | Name | Date |
| --- | --- | --- |
| 985,479 | Waller | Feb. 28, 1911 |
| 1,025,258 | Firm | May 7, 1912 |
| 1,032,378 | Chandler | July 16, 1912 |
| 1,033,824 | Neidlinger | July 30, 1912 |
| 1,287,887 | Coleman | Dec. 17, 1918 |
| 1,383,552 | McDonough | July 5, 1921 |
| 1,889,967 | Ahlburg | Dec. 6, 1932 |
| 2,168,431 | Olson | Aug. 8, 1939 |
| 2,186,788 | Olson | Jan. 9, 1940 |
| 2,234,583 | Thatcher | Mar. 11, 1941 |